(12) United States Patent
Rozman et al.

(10) Patent No.: US 8,299,738 B2
(45) Date of Patent: Oct. 30, 2012

(54) MULTI-TASKING POWER PROCESSOR FOR A VEHICLE ELECTRIC SYSTEM

(75) Inventors: Gregory I. Rozman, Rockford, IL (US); Vietson M. Nguyen, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 456 days.

(21) Appl. No.: 12/622,597

(22) Filed: Nov. 20, 2009

(65) Prior Publication Data

US 2011/0121769 A1    May 26, 2011

(51) Int. Cl.
*H02P 6/00* (2006.01)

(52) U.S. Cl. ............... 318/400.27; 318/376; 307/9.1; 307/10.1

(58) Field of Classification Search ......... 318/400.27, 318/376, 140–150, 378; 307/9.1, 10.1; 363/103
See application file for complete search history.

(56) References Cited

U.S. PATENT DOCUMENTS

| | | | |
|---|---|---|---|
| 6,504,730 B1 | 1/2003 | Cooney et al. | |
| 7,112,944 B1 | 9/2006 | Kojori | |
| 7,349,813 B2 * | 3/2008 | Gutierrez et al. | 702/46 |
| 7,439,715 B2 | 10/2008 | Rozman et al. | |
| 7,675,192 B2 * | 3/2010 | Tang et al. | 307/10.1 |
| 7,982,333 B2 * | 7/2011 | Wolf et al. | 307/10.1 |
| 8,026,638 B2 * | 9/2011 | King et al. | 307/77 |
| 2005/0254273 A1 * | 11/2005 | Soudier et al. | 363/103 |
| 2006/0284487 A1 * | 12/2006 | Tang et al. | 307/9.1 |
| 2007/0194625 A1 | 8/2007 | Maier | |
| 2007/0271044 A1 * | 11/2007 | Gutierrez et al. | 702/45 |
| 2008/0036431 A1 * | 2/2008 | Wolf et al. | 323/234 |
| 2008/0111420 A1 | 5/2008 | Anghel et al. | |
| 2009/0115269 A1 | 5/2009 | Rozman et al. | |
| 2010/0090525 A1 * | 4/2010 | King et al. | 307/10.1 |
| 2010/0090626 A1 * | 4/2010 | King | 318/376 |
| 2011/0037320 A1 * | 2/2011 | King et al. | 307/45 |

OTHER PUBLICATIONS

Ali Emadi, et al., Vehicular Electric Power Systems. Land, Sea, Air and Space Vehicles, Marcel Dekker, Inc., NY, 2004, relevant pages, 4 pages.

* cited by examiner

*Primary Examiner* — Paul Ip
(74) *Attorney, Agent, or Firm* — Cantor Colburn LLP

(57) ABSTRACT

A multi-tasking power processor (104) for a vehicle electric system (100) is provided. The multi-tasking power processor (104) includes a low voltage direct current bus interface (201), a high voltage direct current bus interface (202), and a motor interface (203). The multi-tasking power processor (104) also includes converter circuitry (200) selectively configurable as a direct current boost converter and a direct current buck converter between the low voltage direct current bus interface (201) and the high voltage direct current bus interface (202). The multi-tasking power processor (104) is further configurable as a motor drive between the motor interface (203) and the high voltage direct current bus interface (202).

14 Claims, 3 Drawing Sheets

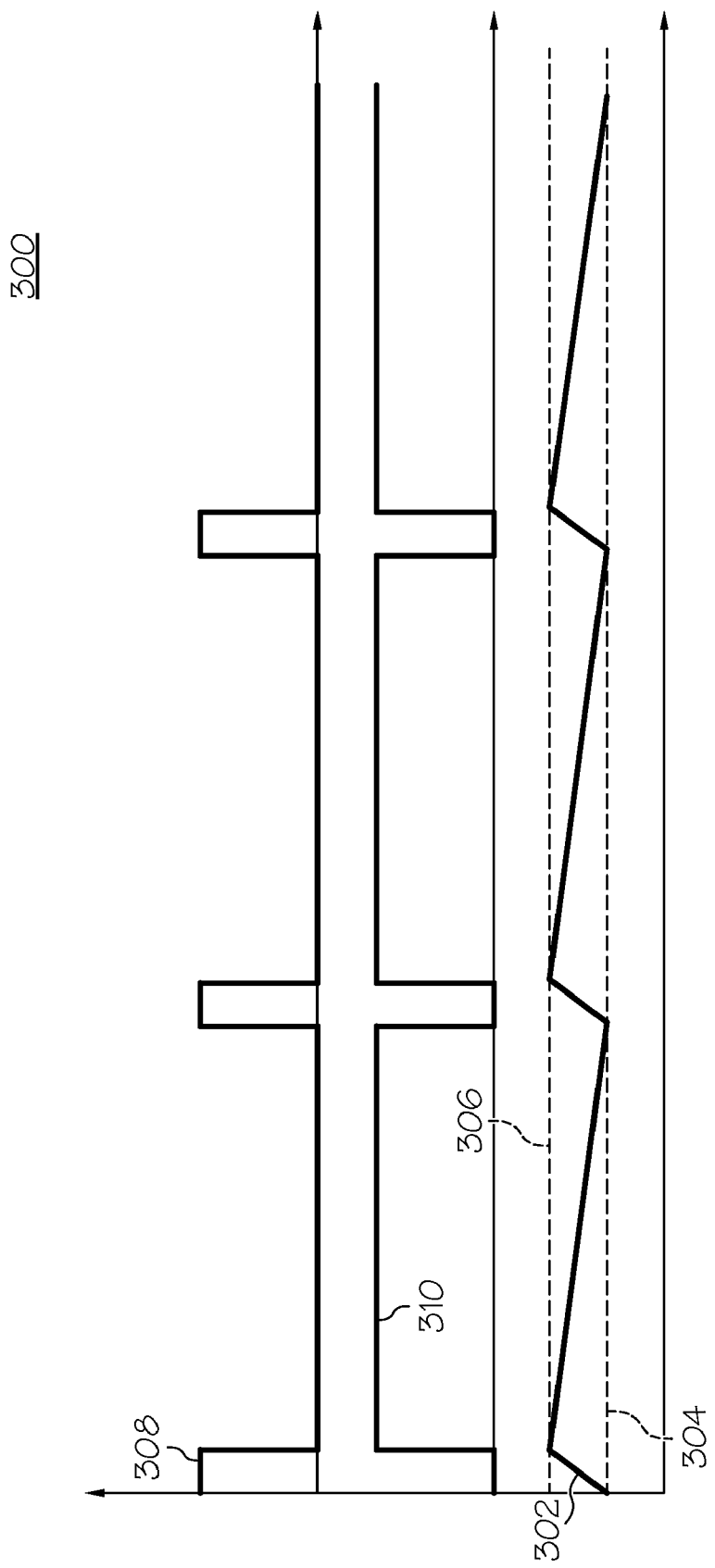

MULTI-TASKING POWER PROCESSOR FOR A VEHICLE ELECTRIC SYSTEM

BACKGROUND OF THE INVENTION

The subject matter disclosed herein generally relates to electrical power distribution, and more particularly to a multi-tasking power processor for a vehicle electric system.

Electric vehicles, including hybrid vehicles, typically include multiple power electronic converters to perform a variety of functions. Systems such as starter/generation, traction control, environmental control, and transient load management may use a combination of direct and/or alternating current. A vehicle electric system typically includes a plurality of power conversion units (PCUs) connected to a common high voltage direct current bus, where each PCU performs a dedicated function. A greater number of discrete components and individual PCUs used to implement power management and distribution can increase ownership cost, as well as the overall weight and size of the vehicle electric system.

BRIEF DESCRIPTION OF THE INVENTION

According to one aspect of the invention, a multi-tasking power processor for a vehicle electric system is provided. The multi-tasking power processor includes a low voltage direct current bus interface, a high voltage direct current bus interface, and a motor interface. The multi-tasking power processor also includes converter circuitry selectively configurable as a direct current boost converter and a direct current buck converter between the low voltage direct current bus interface and the high voltage direct current bus interface. The multi-tasking power processor is further configurable as a motor drive between the motor interface and the high voltage direct current bus interface.

According to yet another aspect of the invention, a method for implementing a multi-tasking power processor in a vehicle electric system is provided. The method includes coupling the multi-tasking power processor to a motor, a low voltage direct current bus, and a high voltage direct current bus of the vehicle electric system. The method also includes selectively configuring converter circuitry of the multi-tasking power processor as a direct current boost converter and a direct current buck converter between the low voltage direct current bus and the high voltage direct current bus. The method additionally includes reconfiguring the converter circuitry as a motor drive between the motor and the high voltage direct current bus.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is an example of duty cycle control for a multi-tasking power processor.

The detailed description explains embodiments of the invention, together with advantages and features, by way of example with reference to the drawings.

DETAILED DESCRIPTION OF THE INVENTION

Figure 1:
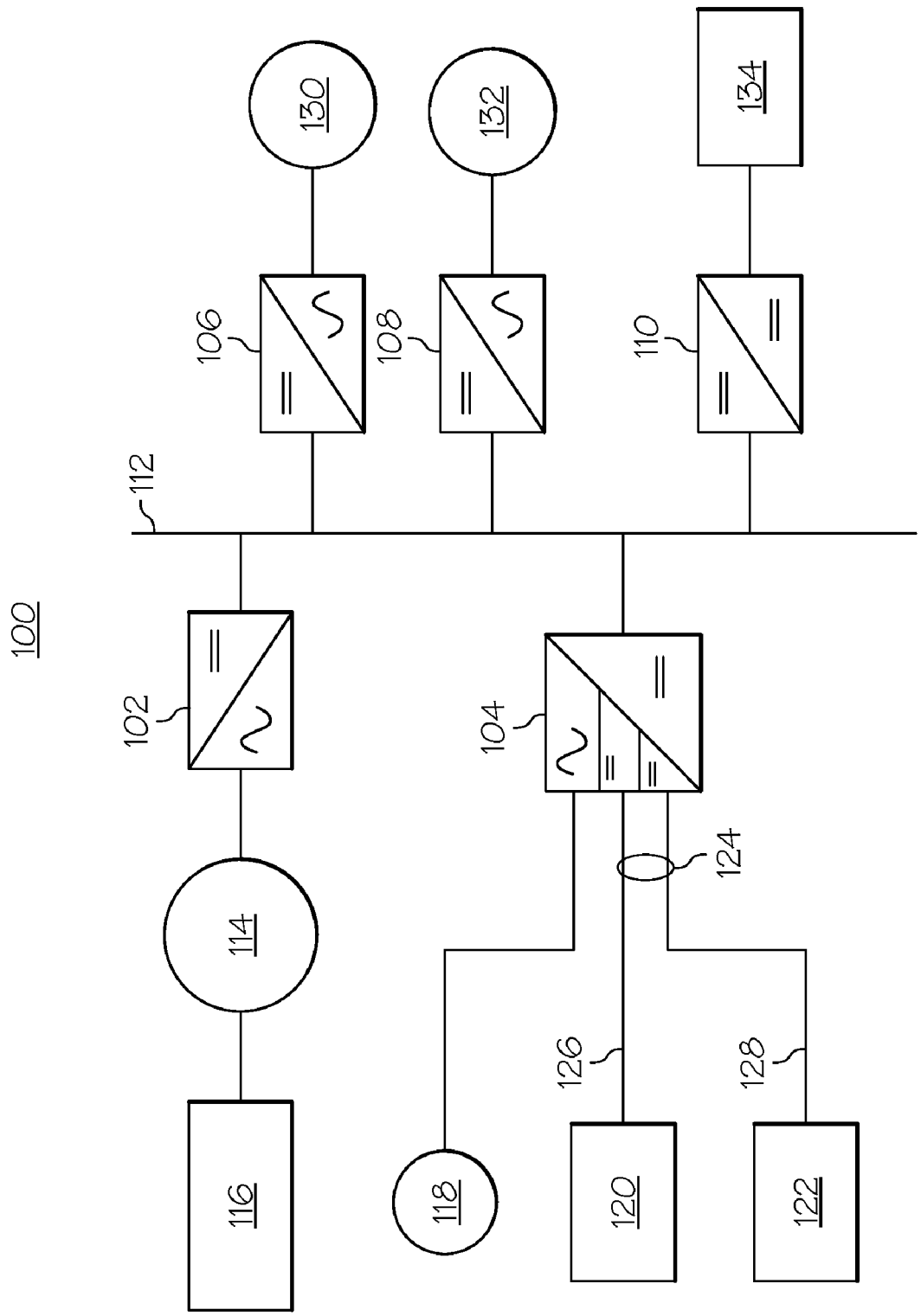
FIG. 1 illustrates an exemplary embodiment of a vehicle electric system including a multi-tasking power processor.

FIG. 1 illustrates an exemplary embodiment of a vehicle electric system 100. The vehicle electric system 100 can be part of an electric vehicle power architecture for a variety of electric and hybrid electric vehicle types, including, but not limited to automobiles, aircraft, watercraft, and various military vehicles.

The vehicle electric system 100 includes multiple power conversion units (PCUs) 102-110 connected to a common high voltage dc (HVDC) bus 112, where each of the PCUs 102-110 performs one or more functions. For example, PCU 102 can perform alternating-to-direct current (AC/DC) conversion to support a synchronous starter/generator 114 for prime mover 116. PCU 102 may provide an engine start function as well as an active rectification function to produce HVDC. While PCU 102 provides multiple functions, the functions are active at different stages of operation. For instance, PCU 102 may initially draw current from the HVDC bus 112 when the synchronous starter/generator 114 starts the prime mover 116. Once the prime mover 116 has been started, the PCU 102 can rectify the output of the synchronous starter/generator 114 to drive current onto the HVDC bus 112.

PCU 104 is also referred to as multi-tasking power processor 104. The multi-tasking power processor 104 handles both AC/DC conversions and DC/DC conversions. For example, the multi-tasking power processor 104 can provide power conversions for a motor 118, energy storage 120, and battery 122, and interface to the HVDC bus 112. Rather than using separate PCUs for the motor 118, energy storage 120, and battery 122, the multi-tasking power processor 104 combines multiple conversion functions into a single PCU. The multi-tasking power processor 104 can convert DC voltage from the HVDC bus 112 into a variable frequency-variable voltage output to drive the motor 118, which may be a cooling fan. The multi-tasking power processor 104 draws direct current from the HVDC bus 112 to store in energy storage 120 or to charge battery 122 using a DC-DC down conversion (buck mode). A low voltage direct current (LVDC) bus 124 can connect the multi-tasking power processor 104 to energy storage 120 using low voltage link 126 and to battery 122 using low voltage link 128. Additionally, the multi-tasking power processor 104 can source direct current to the HVDC bus 112 using a DC-DC up conversion (boost mode).

The vehicle electric system 100 may include a variety of other PCUs to support various functions. For example, PCUs 106 and 108 can perform DC/AC conversion to drive traction motors 130 and 132 as part of a traction drive system. PCU 110 is a DC/DC converter to source current for loads at one or more voltages, for instance, a 28 VDC accessory bus 134.

During normal vehicle operation, the multi-tasking power processor 104 drives motor 118. During traction drive system regenerative braking, voltage on the HVDC bus 112 can increase. When voltage on the HVDC bus 112 increases, the multi-tasking power processor 104 disconnects the motor 118 and connects the energy storage device 120 or the battery 122 in coordination with active rectification of PCU 102, thus providing effective transient load management. During engine start from the battery 122 or during quiet vehicle operation, the multi-tasking power processor 104 may be configured as a boost DC-DC converter.

Figure 2:
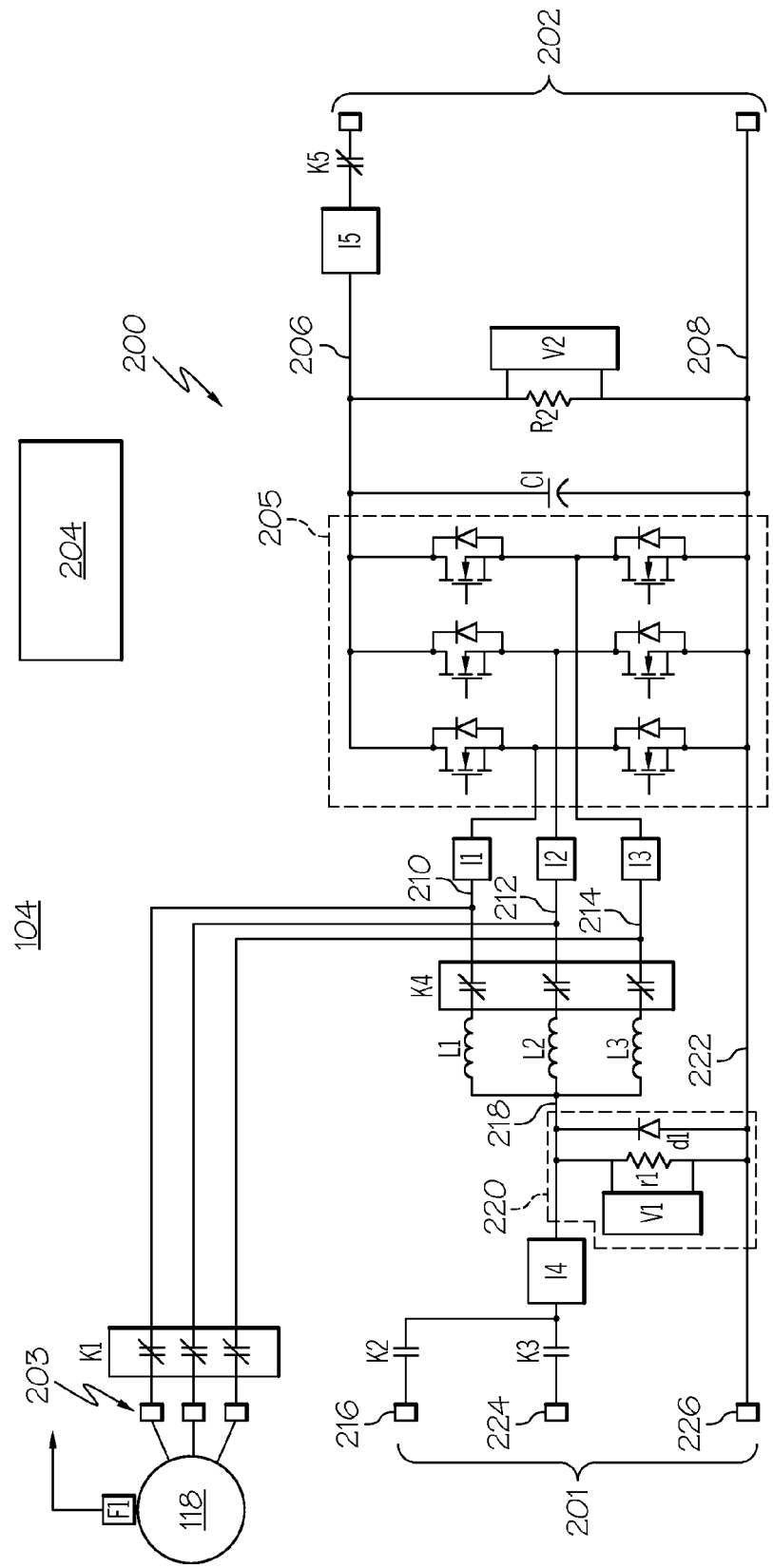
FIG. 2 is an example of an electrical schematic of a multi-tasking power processor.

FIG. 2 is an example of an electrical schematic of the multi-tasking power processor 104 of FIG. 1. The multi-tasking power processor 104 includes converter circuitry 200 selectively configurable as a direct current boost converter and a direct current buck converter between an LVDC bus interface 201 and an HVDC bus interface 202. Interfaces 201 and 202 shall also be referred to as connections herein. The converter circuitry 200 is further configurable as a motor drive between a motor interface 203 and the HVDC bus interface 202. Multiple contactors K1, K2, K3, K4, and K5 are used to open or close electrical connections in the multi-tasking power processor 104, reconfiguring the converter circuitry 200 as a function of operating mode. Table 1 provides an example of mode based on/off selections for the contactors K1-K5, including a failure mode. Contactors K1 are motor interface contactors. Contactors K2 and K3 are separately configurable LVDC bus interface contactors, where K2 is an energy storage contactor and K3 is a battery contactor. Contactors K4 are phase contactors, and contactor K5 is an HVDC bus interface contactor.

TABLE 1

Multi-tasking Power Processor Operating Modes

| Operating Mode | K1 | K2 | K3 | K4 | K5 | Converter Mode |
|---|---|---|---|---|---|---|
| Battery Operation | Off | Off | On | On | On | Boost |
| Motor Operation | On | Off | Off | Off | On | Motor Drive |
| Battery Charge | Off | Off | On | On | On | Buck |
| Energy Store | Off | On | Off | On | On | Buck |
| Failure Mode | Off | Off | Off | Off | Off | Off |

A controller 204 can control the on/off state of the contactors K1-K5. The controller 204 may be integrated within the multi-tasking power processor 104 or included elsewhere in the vehicle electric system 100 of FIG. 1. The controller 204 can also drive on/off states of switches 205 to control phase timing in the multi-tasking power processor 104. The controller 204 may monitor motor speed of motor 118 using speed sensor F1. The controller 204 can also monitor voltages and currents in the multi-tasking power processor 104 using voltage sensors V1 and V2 and current sensors I1, I2, I3, I4, and I5.

The HVDC bus interface 202 provides connection points to HVDC bus 112 of FIG. 1, where contactor K5 is a switching point. Current sensor I5 measures the current flowing through contactor K5. Voltage sensor V2 measures the voltage drop through resistor R2 between a high side 206 and low side 208 of the HVDC bus interface 202. Capacitor C1 is disposed in parallel to resistor R2. Switches 205 may include a plurality of power switching devices disposed between the high side 206 and low side 208 of the HVDC bus interface 202 to control current flow on phases 210, 212, and 214. Current sensors I1, I2, and I3 can be used to measure the current flowing in phases 210, 212, and 214 respectively. Motor interface contactors K1 provide on/off connections between phases 210, 212, and 214 and motor interface 203. Contactors K4 provide on/off connections between phases 210, 212, and 214 and inductors L1, L2, and L3.

Contactor K2 provides an on/off connection between energy storage interface 216 and node 218, where node 218 is coupled to the combination of inductors L1, L2, and L3. Also at node 218, a protection circuit 220 is connected to return 222. Return 222 is a common connection between low side 226 of the LVDC bus interface 201 and the low side 208 of HVDC bus interface 202. The protection circuit 220 may be used for bleeding current through resistor R1 and/or diode D1. Voltage sensor V1 measures voltage across resistor R1, which may be equivalent to the battery voltage or energy storage voltage depending upon the state of contactors K2 and K3.

Battery interface 224 and the low side 226 of the LVDC bus interface 201 provide connections to battery 122 of FIG. 1. The low side 226 of the LVDC bus interface 201 may also connect to energy storage 120 of FIG. 1. Current sensor I4 can be used to measure the current flowing to and from energy storage 120 and battery 122 of FIG. 1 depending upon the state of contactors K2 and K3.

The three inductors L1, L2, and L3 create a three-phase interleaved converter to boost current from energy storage 120 and battery 122 of FIG. 1 or to buck current from the HVDC bus 112 of FIG. 1 to a lower value for storage/charging. The current on the three phases 210, 212, and 214 may be interleaved by 120 degrees. It is possible to accommodate both operation of motor 118 and charging of battery 122 by controlling the duty cycle of the multi-tasking power processor 104. In this operating mode, the duty cycle control is a function of inertia of the motor 118 and allowable speed droop. When the motor 118 is a cooling fan, precision control of the cooling fan may not be needed, enabling the cooling fan to operate in a speed band by limiting fan acceleration to a time period where the fan speed has been reduced to a lower speed threshold until the fan speed reaches an upper speed threshold. FIG. 3 illustrates an example of duty cycle control 300 for multi-tasking power processor 104.

As motor speed 302 of motor 118 of FIG. 1 climbs above lower speed threshold 304 towards upper speed threshold 306, the converter circuitry 200 of FIG. 2 is configured as a motor drive, resulting in motor acceleration 308 for a period of time. When the motor speed 302 reaches the upper speed threshold 306, the converter circuitry 200 is configured as a direct current buck converter, which enables battery charging 310. Absent acceleration, the inertia of the motor 118 keeps the motor 118 rotating, but the motor speed 302 decays over time until being at or below the lower speed threshold 304. Again, upon the motor speed 302 reaching or going below the lower speed threshold 304, the converter circuitry 200 is reconfigured from a direct current buck converter to a motor drive. The duty cycle control 300 can be implemented in controller 204 of FIG. 2 using input from speed sensor F1 of FIG. 2 and comparator circuits to establish the lower and upper speed thresholds 304 and 306.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A multi-tasking power processor (104) for a vehicle electric system (100), comprising:
   a low voltage direct current bus connection (201);
   a high voltage direct current bus connection (202);
   a motor interface (203); and
   converter circuitry (200) selectively configurable as a direct current boost converter and a direct current buck converter between the low voltage direct current bus connection (201) and the high voltage direct current bus connection (202), and further configurable as a motor drive between the motor interface (203) and the high voltage direct current bus interface (202);

wherein the converter circuitry (200) further comprises motor interface contactors (K1) and low voltage direct current bus connection contactors (K2, K3) selectively configurable to electrically connect and disconnect the motor interface (203) and the low voltage direct current bus connection (201) to the converter circuitry (200);

wherein the converter circuitry (200) further comprises a plurality of switches (205) disposed between a high side (206) and a low side (208) of the high voltage direct current bus connection (202) to control current flow on a plurality of phases (210, 212, 214), and further wherein the plurality of phases (210, 212, 214) are electrically connected to the motor interface contactors (K1); and wherein the plurality of switches (205) provide a variable voltage and variable frequency on the plurality of phases (210, 212, 214) when the converter circuitry (200) is selectively configured as the motor drive.

2. The multi-tasking power processor (104) of claim 1 wherein the low voltage direct current bus interface (201) is further comprised of an energy storage interface (216) and a battery interface (224), and the low voltage direct current bus interface contactors (K2, K3) are further comprised of a separately configurable energy storage contactor (K2) and battery contactor (K3).

3. The multi-tasking power processor (104) of claim 1 wherein the plurality of phases (210, 212, 214) are electrically connected to a plurality of phase contactors (K4), the plurality of phase contactors (K4) are electrically connected to a plurality of inductors (L1, L2, L3) which are coupled at a node (218) electrically connected to the low voltage direct current bus interface contactors (K2, K3).

4. The multi-tasking power processor (104) of claim 3 wherein the plurality of inductors (L1, L2, L3) provides a three-phase boost between the low voltage direct current bus interface (201) and the high voltage direct current bus interface (202) when the converter circuitry (200) is selectively configured as the direct current boost converter, and the plurality of inductors (L1, L2, L3) provides a three-phase buck between the low voltage direct current bus interface (201) and the high voltage direct current bus interface (202) when the converter circuitry (200) is selectively configured as the direct current buck converter.

5. The multi-tasking power processor (104) of claim 3 wherein the plurality of phase contactors (K4) electrically disconnect the plurality of inductors (L1, L2, L3) when the converter circuitry (200) is selectively configured as the motor drive.

6. The multi-tasking power processor (104) of claim 1 wherein a controller (204) monitors a motor speed (302) of a motor (118) coupled to the motor interface (203) and selectively configures the converter circuitry (200) as the motor drive in response to the motor speed (302) being at or below a lower speed threshold (304) and selectively configures the converter circuitry (200) as the direct current buck converter in response to the motor speed (302) reaching an upper speed threshold (306).

7. The multi-tasking power processor (104) of claim 6 wherein the motor (118) is a cooling fan.

8. A method for providing a multi-tasking power processor (104) in a vehicle electric system (100), comprising:
coupling the multi-tasking power processor (104) to a motor (118), a low voltage direct current bus (124), and a high voltage direct current bus (112) of the vehicle electric system (100);

selectively configuring converter circuitry (200) of the multi-tasking power processor (104) as a direct current boost converter and a direct current buck converter between the low voltage direct current bus (124) and the high voltage direct current bus (112);

reconfiguring the converter circuitry (200) as a motor drive between the motor (118) and the high voltage direct current bus (112);

wherein selectively configuring the converter circuitry (200) as the direct current boost converter and the direct current buck converter further comprises opening motor interface contactors (K1) and closing low voltage direct current bus interface contactors (K2, K3), and wherein reconfiguring the converter circuitry (200) as the motor drive further comprises closing the motor interface contactors (K1) and opening the low voltage direct current bus interface contactors (K2, K3);

controlling current flow on a plurality of phases (210, 212, 214) using a plurality of switches (205) disposed between a high side (206) and a low side (208) of the high voltage direct current bus (112), wherein the plurality of phases (210, 212, 214) are electrically connected to the motor interface contactors (K1) and wherein the plurality of switches (205) provide a variable voltage and variable frequency on the plurality of phases (210, 212, 214) when the converter circuitry (200) is selectively configured as the motor drive.

9. The method of claim 8 wherein the low voltage direct current bus (124) is coupled to energy storage (120) and a battery (122), and the low voltage direct current bus interface contactors (K2, K3) are further comprised of a separately configurable energy storage contactor (K2) and battery contactor (K3).

10. The method of claim 8 further comprising:
electrically connecting the plurality of phases (210, 212, 214) to a plurality of phase contactors (K4);
electrically connecting the plurality of phase contactors (K4) to a plurality of inductors (L1, L2, L3); and
coupling the plurality of inductors (L1, L2, L3) at a node (218) electrically connected to the low voltage direct current bus interface contactors (K2, K3).

11. The method of claim 10 further comprising:
providing a three-phase boost between the low voltage direct current bus (124) and the high voltage direct current bus (112) through the plurality of inductors (L1, L2, L3) when the converter circuitry (200) is selectively configured as the direct current boost converter; and
providing a three-phase buck between the low voltage direct current bus (124) and the high voltage direct current bus (112) through the plurality of inductors (L1, L2, L3) when the converter circuitry (200) is selectively configured as the direct current buck converter.

12. The method of claim 10 further comprising:
opening the plurality of phase contactors (K4) to electrically disconnect the plurality of inductors (L1, L2, L3) when the converter circuitry (200) is selectively configured as the motor drive.

13. The method of claim 8 further comprising:
monitoring a motor speed (302) of the motor (118);
reconfiguring the converter circuitry (200) as the motor drive in response to the motor speed (302) being at or below a lower speed threshold (304); and
selectively configuring the converter circuitry (200) as the direct current buck converter in response to the motor speed (302) reaching an upper speed threshold (306).

14. The method of claim 8 wherein the motor (118) is a cooling fan.

* * * * *